United States Patent [19]

Endo et al.

[11] Patent Number: 4,559,387
[45] Date of Patent: Dec. 17, 1985

[54] PRIMER COMPOSITION

[75] Inventors: Isao Endo; Joji Kuniya, both of Ohta, Japan

[73] Assignee: Toshiba Silicone Co., Ltd., Tokyo, Japan

[21] Appl. No.: 658,106

[22] Filed: Oct. 5, 1984

[30] Foreign Application Priority Data

Oct. 14, 1983 [JP] Japan .................................. 58-191976

[51] Int. Cl.$^4$ .............................................. C08F 8/00
[52] U.S. Cl. ...................................... 525/102; 528/30; 528/32; 528/38
[58] Field of Search .................... 525/102; 528/30, 32, 528/38

[56] References Cited

U.S. PATENT DOCUMENTS

| 4,151,157 | 4/1979 | Williams et al. | 525/102 |
| 4,319,007 | 3/1982 | Khattab | 525/102 |
| 4,404,349 | 9/1983 | Keogh | 525/102 |

Primary Examiner—Melvyn I. Marquis
Attorney, Agent, or Firm—Gary L. Loser

[57] ABSTRACT

A primer composition comprising
(A) 100 parts by weight of a silane-modified resin obtained by reacting a resin formed by introducing an epoxy group and a hydroxyl group (which may be partially esterified) into a polymer comprising 1,3-pentadiene as a main monomer and having an iodine value of 200 to 500 and an average molecular weight of 350 to 10,000 with a carbon-functional silane, (B) 40 to 600 parts by weight of a mercapto group-containing silane represented by the general formula:

$$HS(CH_2)_a Si\!-\!OR^1)_3$$

wherein a is an integer equal to 2 or 3, and $R^1$ is an alkyl group having 1 to 4 carbon atoms, (C) 10 to 400 parts by weight of an amino group-containing silane represented by the general formula $$X(CH_2)_b\!-\!\underset{\underset{(CH_3)_c}{|}}{Si}\!-\!(OR^2)_{3-c}$$

where X stands for a substituted or unsubstituted amino group selected from the group consisting of:
—$N(R^3)_2$,
—$NH(CH_2)_2 N(R^3)_2$ and
—$NH(CH_2)_2 NH(CH_2)_2 N(R^3)_2$, b is an integer equal to 3 or 4, c is an integer equal to 0 or 1, $R^2$ is an alkyl group having 1 to 4 carbon atoms, and $R^3$ is a hydrogen atom or an alkyl group having 1 or 2 carbon atoms, (D) 5 to 200 parts by weight of a silicon compound represented by the following formula or a partially hydrolyzed condensate thereof:

$$(R^4)_d Si(OR^5)_{4-d}$$

wherein $R^4$ is a monovalent hydrocarbon group having 1 to 6 carbon atoms, $R^5$ is an alkyl group having 1 to 4 carbon atoms or an alkoxyalkyl group having a total carbon number of 3 to 6, and d is an integer equal to 0 or 1, and (E) 300 to 3,000 parts by weight of an organic solvent.

15 Claims, No Drawings

PRIMER COMPOSITION

This patent application claims priority of Japanese patent application Ser. No. 83/191976, filed Oct. 14, 1983.

BACKGROUND OF THE INVENTION

The present invention relates to a primer composition. More particularly, the invention relates to a primer composition which can be dried at ambient temperature to form a strong and transparent coating or film on the surface of a substrate, provide excellent adhesion between the substrate and a silicone elastomer, and which can be used effectively as a primer.

A means which is often employed for bonding a room temperature-curable silicone elastomer to a substrate is to treat the substrate in advance with a primer and then apply the room temperature curable silicone elastomer thereto. One of the main uses of a room temperature curable silicone elastomer is as a sealant, for example, in construction. Anodized aluminum, because it is lightweight and exhibits excellent weatherability and colorfastness, is often used as an exterior wall of a building to which silicone elastomer must be bonded. It has been suggested that silicone elastomer has inferior adhesion to anodized aluminum than conventional aluminum materials such as (surface-oxidized— aluminum, acrylic resin coated aluminum and duralumin. Also, in the case of anodized aluminum, satisfactory adhesion cannot be obtained regardless of the primer used. Because anodized aluminum is often used in combination with conventional construction materials such as mortar, concrete, precast concrete (PC), autoclaved light concrete (ALC), marble and granite, a suitable primer must exhibit good adhesion not only to the anodized aluminum but also to these conventional materials. Moreover, since anodized aluminum is frequently used in combination with coated metals, stainless steel, plastics and glass, good adhesion to these materials is also required. However, because there has not been present a primer having good adhesion to all of the above-mentioned materials, there is often adopted a method in which different primers are used for each of the respective materials so as to obtain satisfactory adhesion. However, such an operation is very complicated. Therefore, development of a primer having good adhesion to all of the materials to be bonded is very desirable.

Satisfactory primers have been developed for conventional construction substrates, but a primer having good adhesion not only to anodized aluminum but also to other materials to be bonded has not heretofore been developed.

Japanese Patent Application Laid-Open Specifications No. 158499/79 and No. 50979/81 already disclose a silane-modified resin obtained by reacting a resin formed by introducing an epoxy group and a hydroxyl group (which may be partially esterified) into a homopolymer of 1,3-pentadiene or a copolymer of 1,3-pentadiene with another monomer, having an iodine value of 200 to 500 and an average molecular weight of 350 to 10,000, with a carbon-functional silane as one component of a primer. As the other component of the primer, a mixture of a chlorinated polymer and an organic polyisocyanate or an acrylic resin, a polyurethane resin or a mixture thereof is used. Accordingly, these primer compositions are insufficient in the resistance to heat, ozone, ultraviolet radiation and weathering. When these primer compositions are used with a silicone sealant having the highest durability among known sealing compounds, the bonding capacity cannot be maintained for a long time and the bonding strength is limited. Moreover, these primer compositions are insufficient in their bondability to colored anodized aluminum which is considered most difficult to bond.

We conducted research with a view towards developing a primer composition free of the foregoing shortcomings, and, as a result, have found that a primer composition obtained by adding a mercapto group-containing silane, an amino group-containing silane and a silicon compound or a partially hydrolyzed condensate thereof to the above-mentioned known silane-modified resin is excellent in bondability or adhesion to anodized aluminum and has good bondability to materials such as mortar or concrete, metals such as steel or stainless steel, paints comprising an acrylic resin or epoxy resin as a vehicle and glass.

The present invention has now been completed based on this finding, and it is a primary object of the present invention to provide a primer composition capable of imparting excellent adhesion or bondability between a silicone elastomer and conventional construction substrates as well as anodized aluminum.

SUMMARY OF THE INVENTION

A primer composition comprising:

(A) 100 parts by weight of a silane-modified resin obtained by reacting a resin formed by introducing an epoxy group and a hydroxyl group (which may be partially esterified) into a polymer comprising 1,3-pentadiene as a main monomer and having an iodine value of 200 to 500 and an average molecular weight of 350 to 10,000 with a carbon-functional silane, (B) 40 to 600 parts by weight of a mercapto group-containing silane represented by the general formula:

$$HS(CH_2)_a-Si-(OR^1)_3$$

wherein $a$ is an integer equal to 2 or 3, and $R^1$ is an alkyl group having 1 to 4 carbon atoms, (C) 10 to 400 parts by weight of an amino group-containing silane represented by the general formula $$X(CH_2)_b-\underset{\underset{(OR^2)_{3-c}}{|}}{Si}-(CH_3)_c$$

where X stands for a substituted or unsubstituted amino group selected from the group consisting of:
—$N(R^3)_2$,
—$NH(CH_2)_2N(R^3)_2$ and
—$NH(CH_2)_2NH(CH_2)_2N(R^3)_2$,
$b$ is an integer equal to 3 or 4, $c$ is an integer equal to 0 or 1, $R^2$ is an alkyl group having 1 to 4 carbon atoms, and $R^3$ is a hydrogen atom or an alkyl group having 1 or 2 carbon atoms, (D) 5 to 200 parts by weight of a silicon compound represented by the following formula or a partially hydrolyzed condensate thereof:

$$(R^4)_dSi(OR^5)_{4-d}$$

wherein $R^4$ is a monovalent hydrocarbon group having 1 to 6 carbon atoms, $R^5$ is an alkyl group having 1 to 4 carbon atoms or an alkoxyalkyl group having a total carbon number of 3 to 6, and d is an integer equal to 0 or 1, and (E) 300 to 3,000 parts by weight of an organic solvent.

DESCRIPTION OF THE INVENTION

In accordance with the present invention, the above object can be attained by a primer composition comprising:

(A) 100 parts by weight of a silane-modified resin obtained by reacting a resin formed by introducing an epoxy group and a hydroxyl group (which may be partially esterified) into a polymer comprising 1,3-pentadiene as a main monomer and having an iodine value of 200 to 500 and an average molecular weight of 350 to 10,000 with a carbon-functional silane, (B) 40 to 600 parts by weight of a mercapto group-containing silane represented by the general formula:

$$HS(CH_2)_a-Si-(OR^1)_3$$

wherein a is an integer equal to 2 or 3, and $R^1$ is an alkyl group having 1 to 4 carbon atoms, (C) 10 to 400 parts by weight of an amino group-containing silane represented by the general formula:

$$X(CH_2)_b(CH_3)_cSi(OR^2)_{3-c}$$

wherein X stands for a substituted or unsubstituted amino group selected from the group consisting of
—$N(R^3)_2$,
—$NH(CH_2)_2N(R^3)_2$ and
—$NH(CH_2)_2NH(CH_2)_2N(R^3)_2$,
b is an integer equal to 3 or 4, c is an integer equal to 0 or 1, $R^2$ is an alkyl group having 1 to 4 carbon atoms, and $R^3$ is a hydrogen atom or an alkyl group having 1 or 2 carbon atoms, (D) 5 to 200 parts by weight of a silicon compound represented by the following formula or a partially hydrolyzed condensate thereof:

$$(R^4)_dSi(OR^5)_{4-d}$$

wherein $R^4$ is a monovalent hydrocarbon group having 1 to 6 carbon atoms, $R^5$ is an alkyl group having 1 to 4 carbon atoms or an alkoxyalkyl group having a total carbon number of 3 to 6, and d is an integer equal to 0 or 1, and (E) 300 to 3,000 parts by weight of an organic solvent.

Furthermore, in accordance with the present invention, there is provided a primer composition comprising (A) 100 parts by weight of a silane-modified resin obtained by reacting a resin formed by introducing an epoxy group and a hydroxyl group (which may be partially esterified) into a polymer comprising 1,3-pentadiene as a main monomer and having an iodine value of 200 to 500 and an average molecular weight of 350 to 10,000 with a carbon-functional silane, (B) 40 to 600 parts by weight of a mercapto group-containing silane represented by the general formula:

$$HS(CH_2)_a-Si-(OR^1)_3$$

wherein a is an integer equal to 2 or 3, and $R^1$ is an alkyl group having 1 to 4 carbon atoms, (C) 10 to 400 parts by weight of an amino group-containing silane represented by the general formula:

$$X(CH_2)_b(CH_3)_cSi(OR^2)_{3-c}$$

wherein X stands for a substituted or unsubstituted amino group selected from the group consisting of
—$N(R^3)_2$,
—$NH(CH_2)_2N(R^3)_2$ and
—$NH(CH_2)_2NH(CH_2)_2N(R^3)_2$,
b is an integer equal to 3 or 4, c is an integer equal to 0 or 1, $R^2$ is an alkyl group having 1 to 4 carbon atoms, and $R^3$ is a hydrogen atom or an alkyl group having 1 or 2 carbon atoms, (D) 5 to 200 parts by weight of a silicon compound represented by the following formula or a partially hydrolyzed condensate thereof:

$$(R^4)_dSi(OR^5)_{4-d}$$

wherein $R^4$ is a monovalent hydrocarbon group having 1 to 6 carbon atoms, $R^5$ is an alkyl group having 1 to 4 carbon atoms or an alkoxyalkyl group having a total carbon number of 3 to 6, and d is an integer equal to 0 or 1, (E) 300 to 3,000 parts by weight of an organic solvent, and (F) 0.1 to 50 parts by weight of an organotitanium compound represented by the following general formula or a partially hydrolyzed condensate thereof:

$$Ti(OR^6)_4, Ti(OR^6)_2L_2 \text{ or } TiL_3$$

wherein $R^6$ is an alkyl group having 2 to 4 carbon atoms, and L is a group forming a chelate ring together with the titanium atom.

The silane-modified resin used as component (A) of the present invention is a modified pentadiene resin formed by introducing an epoxy group and a hydroxyl group into a polymer of 1,3-pentadiene alone or with other monomers which can copolymerize such as isoprene, isobutylene, butadiene or styrene, and which has an iodine value of 200 to 500 and an average molecular weight of 350 to 10,000.

A homopolymer of 1,3-pentadiene or a copolymer of 1,3-pentadiene with butadiene, formed by cation polymerization, is especially preferred as the above-mentioned polymer.

The modified pentadiene resin used in the present invention can be obtained by epoxidizing the above-mentioned homopolymer or copolymer or 1,3-pentadiene. It is preferred that this modified resin have an epoxy equivalent of 240 to 1,200 and a hydroxyl equivalent of 300 to 5,000.

The epoxidizing reaction can be accomplished by epoxidizing the double bonds contained in the homopolymer or copolymer of 1,3-pentadiene according to customary procedures. For example, the modified pentadiene resin can be prepared by reacting the above-mentioned homopolymer or copolymer directly or in solution in a solvent with aqueous hydrogen peroxide having a concentration of at least 30% by weight at 50° to 80° C. in the presence of a lower carboxylic acid. In this reaction, the reaction ratio of hydrogen peroxide to the homopolymer or copolymer is such that the amount of hydrogen peroxide is 0.02 to 2.0 moles, preferably 0.3 to 1.0 mole, per double bond contained in the homopolymer or copolymer.

Preferred solvents for dissolving the homopolymer or copolymer include chlorinated hydrocarbon solvents such as chloroform and carbon tetrachloride, and aromatic hydrocarbon solvents such as benzene, toluene and xylene. The solvent is added in an amount of 30 to 90% by volume, preferably 50 to 70% by volume, based on the reaction product. The lower carboxylic acids include formic acid, acetic acid and propionic acid, among which formic acid is especially preferred.

It is preferred that the lower carboxylic acid be used in an amount of 0.01 to 2.0 moles, especially 0.1 to 1.0 mole, per double bond in the starting polymer. Though the use of a catalyst for this epoxidizing reaction is not particularly necessary, an acid catalyst such as sulfuric, phosphoric, or p-toluene sulfonic acid or a cation type ion exchange resin catalyst may be used.

The epoxy group and hydroxyl group of the thus obtained modified pentadiene resin are reacted with a carbon-functional silane. A carbon-functional silane having an epoxy, amino or mercapto group is used for this reaction. For example, there can be mentioned γ-glycidoxypropyltrimethoxysilane, β-(3,4-epoxycyclohexyl)ethyltrimethoxysilane, γ-glycidoxypropyltriethoxysilane, β-(3,4-epoxycyclohexyl) ethylmethyldimethoxysilane, γ-glycidoxypropyltriethoxysilane, β-(3,4-epoxycyclohexyl)ethyltriethoxysilane, aminomethyltriethoxysilane, N-β-aminoethylaminomethyltrimethoxysilane, γ-aminopropyltriethoxysilane, N-(trimethoxysilylpropyl)ethylenediamine. N-(dimethoxymethylsilylpropyl)-ethylenediamine and γ-mercaptopropyltriethoxysilane, among which those having a mercapto group are particularly preferred.

This reaction is carried out in the absence of any catalyst or in the presence of a catalyst such as an organotin compound, a tertiary amine, a metal oxide, a phenol or resorcinol in an appropriate amount, for example, 0.01 to 5%. In order to adjust the viscosity and improve the mixing efficiency, an organic solvent which does not react with the epoxy group of the oligomer or the alkoxy group of the carbon-functional silane, for example, an aliphatic, alicyclic or aromatic hydrocarbon, an ether, an ester, a ketone or a nitrile, may be used according to need. As specific examples of suitable solvents, there can be mentioned toluene, xylene, benzene, solvent naphtha, n-hexane, isoheptane, isooctane, dioxane, acetone, methyl ethyl ketone, methyl isobutyl ketone, diisopropyl ketone, diisobutyl ketone, ethyl acetate, propyl acetate, butyl acetate, ethylene glycol monoethyl ether acetate, diethylene glycol monoethyl ether acetate and 3-methylbutyl acetate. The solvent is used in an amount of up to 200% by weight based on the modified pentadiene resin. Thus, the epoxy group in the modified pentadiene is reacted with the amino or mercapto group of the carbon-functional silane, or the hydroxyl group of the modified pentadiene resin is reacted with the epoxy group of the carbon-functional silane.

In this reaction, the equivalent ratio of the functional group of the modified pentadiene resin to the functional group of the carbon-functional silane is in the range of from 1/0.2 to ½, preferably from 1/0.5 to 1/1.2. It is preferred that this reaction be carried out quantitatively. However, even if the functional group of the modified pentadiene resin is left it has no substantial influences on the application of the primer composition, and since a carbon-functional silane is further added as component (B) or (C), no functional group of the modified pentadiene silane is left. If the amount of carbon-functional silane is excessive, it results in an increase of the amount of component (B) or (C) needed but the characteristics of the primer composition are not substantially influenced.

The silane-modified resin is obtained in the form of a solution in the above-mentioned solvent. This solvent constitutes component (E) in the present invention.

The mercapto group-containing silane used as component (B) in the present invention improves adhesiveness and includes
$HS(CH_2)_2Si(OCH_3)_3$, $HS(CH_2)_2Si(OC_2H_5)_3$, $HS(CH_2)_3Si(OCH_3)_3$ and $HS(CH_2)_3Si(OC_2H_5)_3$.
In view of its availability and ease of synthesis, $HS(CH_2)_3Si(OCH_3)_3$ is preferred.

The mercapto group-containing silane (B) is incorporated in an amount of 40 to 600 parts by weight, preferably 100 to 300 parts by weight, per 100 parts by weight of component (A). If the amount of component (B) is smaller than 40 parts by weight per 100 parts by weight of component (A), the adhesiveness is poor and the water resistance and acid resistance are reduced, while if it exceeds 600 parts by weight per 100 parts by weight of component (A), there is a risk of gelation.

The amino group-containing silane used as component (C) in the present invention has the effect of improving adhesiveness, and includes
$H_2N(CH_2)_3Si(OCH_3)_3$, $H_2N(CH_2)_3Si(OC_2H_5)_3$,
$H_2N(CH_2)_4Si(OCH_3)_3$, $CH_2NH(CH_2)_3Si(OC_2H_5)_3$,
$C_2H_5NH(CH_2)_3Si(OCH_3)_3$, $(CH_3)_2N(CH_2)_3Si(OCH_3)_3$,
$(CH_3)_2N(CH_2)_3Si(OC_2H_5)_3$,
$H_2N(CH_2)_2NH(CH_2)_3Si(OCH_3)_3$,
$(CH_3)_2N(CH_2)_2NH(CH_2)_3Si(OCH_3)_3$ and
$H_2N(CH_2)_2NH(CH_2)_3(CH_3)Si(OCH_3)_2$.
In view of their ease of synthesis, $H_2N(CH_2)_3Si(OC_2H_5)_3$ and $H_2N(CH_2)_2NH(CH_2)_3Si(OCH_3)_3$ are preferred.

The amino group-containing silane (C) is incorporated in an amount of 10 to 400 parts by weight, preferably 20 to 200 parts by weight, per 100 parts by weight of component (A). If the amount of component (C) is smaller than 10 parts by weight per 100 parts by weight of component (A) adhesiveness is poor, while if it exceeds 400 parts by weight per 100 parts by weight of the component (A), there is a risk of gelation of the composition.

The silicon compound or partially hydrolyzed condensate thereof used as the component (D) in the present invention undergoes hydrolysis and polycondensation together with components (A), (B) and (C) by water in air after it is applied on a substrate to form a coating film. For this reason, it is indispensable that there be present 3 or 4 silicon-functional groups bonded to the silicon atom. The silicon-functional group includes, for example, methoxy, ethoxy, propoxy, butoxy, methoxyethoxy and ethoxyethoxy groups. One monovalent hydrocarbon group selected from methyl, ethyl, propyl, butyl, amyl, heptyl, vinyl and phenyl groups may be bonded to the silicon atom. The silicon compound (D) includes, for example,
$(CH_3O)_4Si$, $(C_2H_5O)_4Si$, $(i-C_3H_7O)_4Si$,
$(C_2H_5O)_2(i-C_3H_7O)_2Si$, $(CH_3OC_2H_4O)_4Si$,
$CH_3Si(OCH_3)_3$, $CH_3Si(OC_2H_5)_3$,
$CH_3Si(OC_2H_4OCH_3)_3$, $CH_2=CHSi(OCH_3)_3$,
$CH_2=CHSi(OC_2H_5)_3$, $CH_2=CHSi(OC_2H_4OCH_3)_3$
and $C_6H_5Si(OCH_3)_3$.

An oligomer obtained by partially hydrolyzing and condensing one or more of the foregoing compounds may be used as component (D).

The silicon compound or partially hydrolyzed condensate thereof (D) is incorporated in an amount of 5 to 200 parts by weight, preferably 10 to 50 parts by weight, per 100 parts by weight of component (A). If the amount of the component (D) is smaller than 5 parts by weight per 100 parts by weight of component (A), the film-forming property is poor, while if it exceeds 200 parts by weight per 100 parts by weight of component (A), there is a risk of gelation of the composition.

The organic solvent used as component (E) of the present invention includes, for example, aromatic hydrocarbons such as benzene, toluene, xylene and ethylbenzene, aliphatic hydrocarbons such as n-pentane, n-hexane, n-heptane, isoheptane, isooctane and isononane, ethers such as diethyl ether, dibutyl ether, tetrahydrofuran and dioxane, ketones such as acetone and methyl ethyl ketone, and esters such as methyl acetate, ethyl acetate and butyl acetate.

In view of the adaptability to the coating operation on the surface of a substrate and the prevention of dissolution of a release agent of a peelable adhesive tape used at the time of application of a sealant, it is preferred that an aliphatic hydrocarbon be used as component (E). The organic solvent component (E) gives an appropriate viscosity to the composition and also gives good storage stability. The foregoing organic solvents may be used singly or in combination.

The organic solvent is incorporated in an amount of 300 to 3,000 parts by weight, preferably 500 to 1,500 parts by weight, per 100 parts by weight of component (A). If the amount of component (E) is smaller than 300 parts by weight per 100 parts by weight of component (A), there is a risk of gelation, while if it exceeds 3,000 parts by weight per 100 parts by weight of component (A), a coating film necessary for bonding is not formed and good results are not obtained.

The composition of the present invention comprises the foregoing components (A) through (E), and in order to form a good coating film in a short time, an organotitanium compound or a partially hydrolyzed condensate thereof may effectively be incorporated as component (F).

The organotitanium compound or partially hydrolyzed condensate thereof used as component (F) in the present invention is an alkoxide or chelate compound of titanium, and a partially hydrolyzed condensate thereof can also be used. The organotitanium compound includes, for example, $(C_2H_5O)_4Ti$, $(i-C_3H_7O)_4Ti$, $(C_4H_9O)_4Ti$, diisopropoxybis(acetylacetonato)titanium, diisopropoxybis(ethylacetoacetato)titanium, dibutoxybis(acetylacetonato)titanium, dibutoxybis(ethylacetoacetato)titanium, 1,3-propanedioxybis(acetylacetanato)titanium, 1,3-propanedioxybis(ethylacetoacetato)titanium, 1,4-butanedioxybis(acetylacetanato)titanium and 1,4-butanedioxybis(ethylacetoacetato)titanium. The organotitanium compound or partially hydrolyzed condensate thereof (F) is incorporated in an amount of 0.1 to 50 parts by weight, preferably 1 to 10 parts by weight, per 100 parts by weight of component (A). If the amount of component (F) is smaller than 0.1 part by weight per 100 parts by weight of component (A), a coating film can be formed but it is difficult to form a good coating film in a short time. If the amount of component (F) is larger than 50 parts by weight per 100 parts by weight of the component (A), there is a risk of gelation of the composition.

The primer composition can be prepared merely by mixing the foregoing components. If the composition is heated and aged at 50° to 100° C. after mixing, the drying property of the primer composition is improved and the adhesiveness is increased.

When a room temperature curable silicone elastomer is used as a sealant, the composition of the present invention, coated on the surface of a substrate in advance, provides good bondability or adhesiveness between the substrate and the silicone elastomer. Accordingly, the composition of the present invention can be effectively used as an adhesive.

The primer composition of the present invention is especially effective when anodized aluminum is used as a material to be bonded and the primer composition of the present invention is also effectively used for bonding at the place where anodized aluminum is arranged in combination with mortar, concrete, ALC or PC. Moreover, the primer composition of the present invention is valuable as a pretreating agent for bonding a silicone sealant to glass, metals, plastics and wood. Furthermore, the composition of the present invention is effective as a primer for sealing and encapsulation of electric parts and can be used as an anticorrosive coating agent or lacquer for various substrates.

EXAMPLES

The present invention will now be described with reference to the following examples.

All of "parts" in the examples are by weight, unless otherwise noted. Symbols in tables indicate the following physical properties:

$M_{50}$: stress at 50% elongation
$M_{150}$: stress at 150% elongation
TS: maximum stress at break
E: maximum elongation
CF: cohesive failure ratio

PRODUCTION EXAMPLE 1

Synthesis of Modified Pentadiene Resin A

A four-neck flask equipped with a stirrer, a water-cooled condenser, a dropping funnel and a thermometer was charged with 50 parts of liquid polypentadiene having a molecular weight of 500 and an iodine value of 330 and 150 parts of chloroform. The temperature was elevated to 60° C. with stirring. A mixed solution of 9.3 parts of 80% formic acid and 0.12 part of phosphoric acid and additionally 17.4 parts of 60% aqueous hydrogen peroxide was added thereto over a period of about 2 hours. The reaction product was washed with water to obtain a modified pentadiene resin A having an epoxy equivalent of 456 and a hydroxyl equivalent of 1,600.

PRODUCTION EXAMPLE 2

Synthesis of Silane-Modified Resin B

A four-neck flask equipped with a stirrer, a water-cooled condenser, a dropping funnel and a thermometer was charged with 50 parts of the modified pentadiene resin A prepared in Production Example 1 and 32 parts of toluene. 0.05 part of tin octanoate was added as a catalyst and the temperature was elevated to 90° C. with stirring in a nitrogen atmosphere.

4.5 partts of γ-mercaptopropyltrimethoxysilane was dropped to the mixture over a period of 1 hour. After completion of the dropwise addition, the mixture was maintained at 90° C. for 3 hours with stirring to complete the reaction and obtain a solution of a silane-modified resin B.

From the results of gas chromatography, it was confirmed that unreacted γ-mercaptopropyltrimethoxysilane was not substantially left.

PRODUCTION EXAMPLE 3

Synthesis of Silane-Modified Resin C

The reaction was carried out in the same manner as described in Production Example 2 except that 25 parts of γ-aminopropyltrimethoxysilane was used instead of γ-mercaptopropyltrimethoxysilane and the dropping time was shortened to 30 minutes, whereby a solution of a silane-modified resin C was obtained. From the results of gas chromatography, it was confirmed that unreacted γ-aminopropyltrimethoxysilane was not substantially left.

EXAMPLE 1

A four-neck flask equipped with a stirrer, a water-cooled condenser and a thermometer was charged with 100 parts of the solution of the silane-modified resin B obtained in Production Example 2, 200 parts of n-hexane, 60 parts of $HS(CH_2)_3Si-(OCH_3)_3$, 20 parts of $H_2N(CH_2)_3Si(OC_2H_5)_3$, 20 parts of Ethyl Silicate 40 (partially hydrolyzed condensate of ethyl orthosilicate supplied by Tama Kagaku) and 5 parts of TBT-1000 (partially hydrolyzed condensate of tetrabutyl titanate supplied by Nippon Soda), and the mixture was heated at 70° C. for 3 hours with stirring, cooled and taken out to obtain a primer composition.

Five kinds of anodized aluminum supplied by different makers were used as the substrate for adhesion tests. The above primer composition was applied on each substrate and dried at room temperature for 30 minutes, and Tosseal 361 (aminoxy type of silicone sealant supplied by Toshiba Silicone) was applied thereon. A type 2 test piece for the adhesion test, specified in JIS A 5758, was prepared and allowed to stand still at room temperature for 7 days and at 50° C. for 7 days, whereby curing was effected. The test piece was subjected to the adhesion test at a crosshead speed of 50 mm/min in the initial state and after 7 days immersion in warm water maintained at 50° C. The results obtained in the initial state are shown in Table 1 and those obtained after immersion in water are shown in Table 2. Adhesion failure was not observed in any of the test pieces.

TABLE 1

| Anodized Aluminum | | Initial | | | |
|---|---|---|---|---|---|
| No. | Maker | $M_{50}$ (kgf/cm²) | TS (kgf/cm²) | E (%) | CF (%) |
| A-1 | Sankyo Aluminum Kogyo K.K. | 1.4 | 5.4 | 1,300 | 100 |
| A-2 | Nippon Keikinzoku K.K. | 1.4 | 5.5 | 1,230 | 100 |
| A-3 | Sumitomo Wall System K.K. | 1.4 | 6.1 | 1,300 | 100 |
| A-4 | Nippon Curtain Wall K.K. | 1.4 | 5.2 | 1,240 | 100 |
| A-5 | Fuji Sash K.K. | 1.3 | 6.2 | 1,280 | 100 |

TABLE 2

| Anodized Aluminum | | After Immersion in Water | | | |
|---|---|---|---|---|---|
| No. | Maker | $M_{50}$ (kgf/cm²) | TS (kgf/cm²) | E (%) | CF (%) |
| A-1 | Sankyo Aluminum Kogyo K.K. | 1.3 | 5.0 | 1,310 | 100 |
| A-2 | Nippon Keikinzoku K.K. | 1.4 | 4.9 | 1,280 | 100 |
| A-3 | Sumitomo Wall System K.K. | 1.4 | 5.2 | 1,240 | 100 |
| A-4 | Nippon Curtain Wall K.K. | 1.5 | 5.1 | 1,200 | 100 |
| A-5 | Fuji Sash K.K. | 1.4 | 4.9 | 1,220 | 100 |

COMPARATIVE EXAMPLE 1

A primer composition was prepared in the same manner as described in Example 1 except that 100 parts of a 30% toluene solution of Epikote 828 (supplied by Shell Chemical) was used instead of the solution of the silane-modified resin B, and the adhesion test was carried out in the same manner as described in Example 1. In all the test pieces, adhesion failure was observed. Peeling was caused by a slight stress in the test pieces which had been immersed in water. The measurement results are shown in Table 3.

TABLE 3

| Anodized Aluminum | Initial State | | | | After Immersion in Water | | | |
|---|---|---|---|---|---|---|---|---|
| | $M_{50}$ (kgf/cm²) | TS (kgf/cm²) | E (%) | CF (%) | $M_{50}$ (kgf/cm²) | TS (kgf/cm²) | E (%) | CF (%) |
| A-1 | 1.2 | 2.3 | 500 | 0 | — | 1.0 | — | 0 |
| A-2 | 1.1 | 1.7 | 330 | 0 | — | 0.9 | — | 0 |
| A-3 | 1.3 | 1.9 | 420 | 0 | — | 1.0 | — | 0 |
| A-4 | 1.3 | 1.8 | 380 | 0 | — | 0.3 | — | 0 |
| A-5 | 1.2 | 1.6 | 300 | 0 | — | 0.8 | — | 0 |

COMPARATIVE EXAMPLE 2

A primer composition was prepared in the same manner as described in Example 1 except that 120 parts of the modified pentadiene resin A obtained in Production Example 1 was used instead of the solution of the silane-modified resin B, and the adhesion test was carried out in the same manner as described in Example 1. Adhesion failure was observed in all the test pieces. Peeling was caused by a slight stress in the test pieces which had been immersed in water. The measurement results are shown in Table 4.

TABLE 4

| Anodized Aluminum | Initial State | | | | After Immersion in Water | | | |
|---|---|---|---|---|---|---|---|---|
| | $M_{50}$ (kgf/cm²) | TS (kgf/cm²) | E (%) | CF (%) | $M_{50}$ (kgf/cm²) | TS (kgf/cm²) | E (%) | CF (%) |
| A-1 | 1.4 | 2.8 | 650 | 0 | 1.1 | 1.6 | 110 | 0 |
| A-2 | 1.2 | 2.5 | 610 | 0 | 0.8 | 1.4 | 130 | 0 |

TABLE 4-continued

| Anodized Aluminum | Initial State | | | | After Immersion in Water | | | |
|---|---|---|---|---|---|---|---|---|
| | $M_{50}$ (kgf/cm$^2$) | TS (kgf/cm$^2$) | E (%) | CF (%) | $M_{50}$ (kgf/cm$^2$) | TS (kgf/cm$^2$) | E (%) | CF (%) |
| A-3 | 1.3 | 1.9 | 380 | 0 | — | 0.5 | 40 | 0 |
| A-4 | 1.3 | 2.4 | 530 | 0 | — | 0.8 | 40 | 0 |
| A-5 | 1.3 | 3.0 | 720 | 0 | 0.7 | 1.1 | 90 | 0 |

EXAMPLE 2

A primer composition was prepared in the same manner as described in Example 1 except that 200 parts of a mixed solvent comprising isoheptane and isooctane at a weight ratio of 65/35 was used instead of n-hexane, 60 parts of $H_2N(CH_2)_2NH$-$(CH_2)_3Si(OCH_3)_3$ was used instead of $H_2N(CH_2)_3Si$-$(OC_2H_5)_3$ and no heating was carried out. Not only anodized aluminum but also aluminum, glass, mortar and polyester were used as the substrate, and not only Tosseal 361 but also Tosseal 10 (aminoxy type silicone sealant supplied by Toshiba Silicone) was used as the sealant. The adhesion test was carried out in the same manner as described in Example 1. The test results obtained in the initial state are shown in Table 5, and those obtained after immersion in water are shown in Table 6.

TABLE 5

| Sealant | Substrate | Initial State | | | |
|---|---|---|---|---|---|
| | | $M_{50}$ (kgf/cm$^2$) | TS (kgf/cm$^2$) | E (%) | CF (%) |
| Tosseal 361 | anodized aluminum A-1 | 1.4 | 6.1 | 1,300 | 100 |
| | aluminum | 1.4 | 6.2 | 1,320 | 100 |
| | glass | 1.3 | 6.3 | 1,250 | 100 |
| | mortar | 1.3 | 5.6 | 1,280 | 100 |
| | polyester | 1.4 | 5.7 | 1,230 | 100 |
| Tosseal 10 | anodized aluminum A-1 | 1.3 | 6.0 | 1,180 | 100 |
| | aluminum | 1.3 | 6.8 | 1,230 | 100 |
| | glass | 1.4 | 7.1 | 1,220 | 100 |
| | mortar | 1.2 | 5.8 | 1,080 | 90 |
| | polyester | 1.3 | 7.2 | 1,100 | 100 |

TABLE 6

| Sealant | Substrate | After Immersion in Water | | | |
|---|---|---|---|---|---|
| | | $M_{50}$ (kgf/cm$^2$) | TS (kgf/cm$^2$) | E (%) | CF (%) |
| Tosseal 361 | anodized aluminum A-1 | 1.4 | 5.7 | 1,250 | 100 |
| | aluminum | 1.4 | 5.9 | 1,300 | 100 |
| | glass | 1.3 | 5.8 | 1,310 | 100 |
| | mortar | 1.3 | 5.7 | 1,210 | 100 |
| | polyester | 1.3 | 5.5 | 1,300 | 100 |
| Tosseal 10 | anodized aluminum A-1 | 1.3 | 5.0 | 1,060 | 100 |
| | aluminum | 1.3 | 5.2 | 1,090 | 100 |
| | glass | 1.3 | 6.0 | 1,190 | 100 |
| | mortar | 1.1 | 4.9 | 980 | 30 |
| | polyester | 1.3 | 4.5 | 1,050 | 100 |

EXAMPLE 3

Primer compositions 3-1 through 3-6 were prepared from components shown in Table 7. These primer compositions were subjected to the adhesion test in the same manner as described in Example 1 by using the substrates shown in Table 5 and Tosseal 361. The measurement results are shown in Table 8. All the test pieces exhibited cohesive failure.

TABLE 7

| Primer No. | Compounding Ratios (parts) | | | | | |
|---|---|---|---|---|---|---|
| | 3-1 | 3-2 | 3-3 | 3-4 | 3-5 | 3-6 |
| silane-modified resin B | 100 | 100 | 100 | | | |
| silane-modified resin C | | | | 100 | 100 | 100 |
| $HS(CH_2)_2Si(OCH_3)_3$ | 80 | | | | | |
| $HS(CH_2)_3Si(OCH_3)_3$ | | 60 | 60 | 60 | 70 | 60 |
| $H_2N(CH_2)_3Si(OCH_3)_3$ | 20 | | | 30 | | |
| $H_2N(CH_2)_2NH(CH_2)_3$—$(CH_3)Si(OCH_3)_2$ | | 40 | | | | |
| $H_2N(CH_2)_2NH(CH_2)_3$—$Si(OCH_3)_3$ | | | 30 | | | 40 |
| $(CH_3)_2N(CH_2)_2NH$—$(CH_2)_3Si(OCH_3)_3$ | | | | | 30 | |
| ethyl silicate 40* | | 20 | 20 | | | |
| ethyl silicate 45* | 15 | | | | | 30 |
| $CH_3Si(OCH_3)_3$ | | | | 30 | | |
| $CH_2$=$CHSi$—$(OCH_2CH_2OCH_3)_3$ | | | | | 20 | |
| tetrabutyl titanate TBT-1000 | 5 | 5 | 3 | | | |
| dibutoxybis(acetyl-acetonato)titanium | | | | | 5 | 3 |
| n-hexane | 200 | 200 | 300 | 200 | 200 | 400 |

Note
*partially hydrolyzed condensate of ethyl orthosilicate supplied by Tama Kagaku

TABLE 8

| Primer No. | | | 3-1 | 3-2 | 3-3 | 3-4 | 3-5 | 3-6 |
|---|---|---|---|---|---|---|---|---|
| CF (%) | normal state | anodized aluminum A-1 | 100 | 100 | 100 | 100 | 100 | 100 |
| | | aluminum | " | " | " | " | " | " |
| | | glass | " | " | " | " | " | " |
| | | mortar | " | " | " | " | " | " |
| | | polyester | " | " | " | " | " | " |
| | after immersion in water | anodized aluminum A-1 | 100 | 100 | 100 | 100 | 100 | 100 |
| | | aluminum | " | " | " | " | " | " |
| | | glass | " | " | " | " | " | " |
| | | mortar | " | " | " | " | " | " |
| | | polyester | " | " | " | " | " | " |

EXAMPLE 4

The silane-modified resins B and C obtained in Production Example 2 and 3 were diluted with a solvent to form comparative primers 4-1 and 4-2, respectively. After dilution with the solvent, one or two silicon compounds and a mercapto group-containing silane or an amino group-containing silane were added and mixed at ambient temperature to form a comparative primer 4-3, 4-4, 4-5 or 4-6 or a primer 4-7 of the present invention.

Each primer was subjected to the adhesion test in the same manner as described in Example 1 by using anodized aluminum A-3 as the substrate and Tosseal 361 (supplied by Toshiba Silicone) as the sealant. The obtained results are shown in Table 9.

TABLE 9

| Primer No. | 4-1 | 4-2 | 4-3 | 4-4 | 4-5 | 4-6 | 4-7 |
|---|---|---|---|---|---|---|---|
| compounding ratios (parts) | | | | | | | |
| silane-modified resin B | 100 | | | 100 | 100 | 100 | 100 |
| silane-modified resin C | | 100 | 100 | | | | |
| $HS(CH_2)_3Si(OCH_3)_3$ | | | | | 50 | 50 | 50 |
| $H_2N(CH_2)_2NH(CH_2)_3Si(OCH_3)_3$ | | | | 20 | | 20 | 20 |
| ethyl silicate 40 | | | | | 20 | 20 | 20 |
| ethyl silicate 45 | | | 20 | | | | |
| n-hexane | | | 250 | | | | |
| isooctane | 250 | 250 | | 250 | 250 | | 250 |
| initial state $M_{50}$ (kgf/cm$^2$) | 1.3 | 1.2 | 1.4 | 1.4 | 1.3 | 1.3 | 1.4 |
| TS (kgf/cm$^2$) | 2.5 | 2.2 | 5.4 | 3.9 | 6.0 | 3.4 | 6.4 |
| E (%) | 580 | 520 | 1,080 | 840 | 1,290 | 710 | 1,310 |
| CF (%) | 0 | 0 | 70 | 20 | 100 | 0 | 100 |
| after immersion in water $M_{50}$ (kgf/cm$^2$) | — | — | 1.3 | 1.3 | 1.3 | 1.2 | 1.4 |
| TS (kgf/cm$^2$) | — | — | 3.2 | 4.8 | 5.1 | 2.1 | 6.2 |
| E (%) | — | — | 750 | 980 | 1,010 | 430 | 1,300 |
| CF (%) | — | — | 0 | 0 | 80 | 0 | 100 |

EXAMPLE 5

A primer composition was prepared in the same manner as described in Example 1 except that 160 parts of toluene was used instead of n-hexane. The adhesion test was carried out in the same manner as described in Example 1 except that a copper plate was used as the substrate to be bonded. Either in the initial state or after immersion in water, the elongation was higher than 1,200% and the cohesive failure ratioi was 100%. When a copper plate was coated with this primer composition and dried at room temperature for 30 minutes and the obtained sample was allowed to stand still in an atmosphere where hydrogen chloride vapor was present for 2 weeks, no change was observed. In contrast, when an untreated copper plate was allowed to stand still under the same conditions, verdigris was formed.

EXAMPLE 6

A primer composition was prepared in the same manner as described in Example 1 except that 6 parts of diisopropoxybis(acetylacetonato)titanium was used instead of TBT-1000, and the adhesion test was carried out in the same manner as described in Example 1.

Either in the initial state or after immersion in water, all the test pieces had an elongation higher than 1,200% and the cohesive failure ratio was 100%.

I claim:

1. A primer composition comprising
(A) 100 parts by weight of a silane-modified resin obtained by reacting a resin formed by introducing an epoxy group and a hydroxyl group, which may be partially esterified, into a polymer comprising 1,3-pentadiene as a main monomer and having an iodine value of 200 to 500 and an average molecular weight of 350 to 10,000 with a silane having an epoxy, amino, or mercapto group,
(B) 40 to 600 parts by weight of a mercapto group-containing silane represented by the general formula:

$$HS(CH_2)_aSi{-}OR^1)_3$$

wherein a is an integer equal to 2 or 3, and $R^1$ is an alkyl group having 1 to 4 carbon atoms,
(C) 10 to 400 parts by weight of an amino group-containing silane represented by the general formula $$X(CH_2)_b{-}\underset{\underset{(CH_3)_c}{|}}{Si}{-}(OR^2)_{3-c}$$

where X stands for a substituted or unsubstituted amino group selected from the group consisting of:
—$N(R^3)_2$,
—$NH(CH_2)_2N(R^3)_2$ and
—$NH(CH_2)_2NH(CH_2)_2N(R^3)_2$,
b is an integer equal to 3 or 4, c is an integer equal to 0 or 1, $R^2$ is an alkyl group having 1 to 4 carbon atoms, and $R^3$ is a hydrogen atom or an alkyl group having 1 or 2 carbon atoms,
(D) 5 to 200 parts by weight of a silicon compound represented by the following formula or a partially hydrolyzed condensate thereof:

$$(R^4)_dSi(OR^5)_{4-d}$$

wherein $R^4$ is a monovalent hydrocarbon group having 1 to 6 carbon atoms, $R^5$ is an alkyl group having 1 to 4 carbon atoms or an alkoxyalkyl group having a total carbon number of 3 to 6, and d is an integer equal to 0 or 1, and
(E) 300 to 3,000 parts by weight of an organic solvent.

2. A primer composition as set forth in claim 1, wherein silane-modified resin (A) is prepared by reacting a resin formed by introducing an epoxy group and a hydroxyl group, which may be partially esterified, into a polymer comprising 1,3-pentadiene as a main monomer and having an iodine value of 200 to 500 and an average molecular weight of 350 to 10,000 with a mercapto group-containing silane.

3. A primer composition as set forth in claim 1, wherein the amount of mercapto group-containing silane (B) is 100 to 300 parts by weight.

4. A primer composition as set forth in claim 1, wherein the amount of amino group-containing silane (C) is 20 to 200 parts by weight.

5. A primer composition as set forth in claim 1, wherein the amount of silicon compound (D) or partially hydrolyzed condensate thereof is 10 to 50 parts by weight.

6. A primer composition as set forth in claim 1, wherein organic solvent (E) is an aliphatic hydrocarbon.

7. A primer composition as set forth in claim 1, wherein the amount of organic solvent (E) is 500 to 1,500 parts by weight.

8. A primer composition comprising
(A) 100 parts by weight of a silane-modified resin obtained by reacting a resin formed by introducing an epoxy group and a hydroxyl group, which may be partially esterified, into a polymer comprising 1,3-pentadiene as a main monomer and having an iodine value of 200 to 500 and an average molecular weight of 350 to 10,000 with a silane having an epoxy, amino, or mercapto group,
(B) 40 to 600 parts by weight of a mercapto group-containing silane represented by the general formula:

$$Hs(CH_2)_aSi-OR^1)_3$$

wherein a is an integer equal to 2 or 3, and $R^1$ is an alkyl group having 1 to 4 carbon atoms,
(C) 10 to 400 parts by weight of an amino group-containing silane represented by the general formula $$X(CH_2)_b-\underset{\underset{(CH_3)_c}{|}}{Si}-(OR^2)_{3-c}$$

where X stands for a substituted or unsubstituted amino group selected from the group consisting of:
—$N(R^3)_2$,
—$NH(CH_2)_2N(R^3)_2$ and
—$NH(CH_2)_2NH(CH_2)_2N(R^3)_2$,
b is an integer equal to 3 or 4, c is an integer equal to 0 or 1, $R^2$ is an alkyl group having 1 to 4 carbon atoms, and $R^3$ is a hydrogen atom or an alkyl group having 1 or 2 carbon atoms,
(D) 5 to 200 parts by weight of a silicon compound represented by the following formula or a partially hydrolyzed condensate thereof:

$$(R^4)_dSi(OR^5)_{4-d}$$

wherein $R^4$ is a monovalent hydrocarbon group having 1 to 6 carbon atoms, $R^5$ is an alkyl group having 1 to 4 carbon atoms or an alkoxyalkyl group having a total carbon number of 3 to 6, and d is an integer equal to 0 or 1,
(E) 300 to 3,000 parts by weight of an organic solvent, and
(F) 0.1 to 50 parts by weight of an organotitanium compound represented by the following general formulas or a partially hydrolyzed condensate thereof:

$$Ti(OR^6)_4, Ti(OR^6)_2L_2 \text{ or } TiL_3$$

wherein $R^6$ is an alkyl group having 2 to 4 carbon atoms, and L is a group forming a chelate ring together with the titanium atom.

9. A primer composition as set forth in claim 8, wherein silane-modified resin (A) is prepared by reacting a resin formed by introducing an epoxy group and a hydroxyl group, which may be partially esterified, into a polymer comprising 1,3-pentadiene as a main monomer and having an iodine value of 200 to 500 and an average molecular weight of 350 to 10,000 with a mercapto group-containing silane.

10. A primer composition as set forth in claim 8, wherein the amount of mercapto group-containing silane (B) is 100 to 300 parts by weight.

11. A primer composition as set forth in claim 8, wherein the amount of amino group-containing silane (C) is 20 to 200 parts by weight.

12. A primer composition as set forth in claim 8, wherein the amount of silicon compound (D) or partially hydrolyzed condensate thereof is 10 to 50 parts by weight.

13. A primer composition as set forth in claim 8, wherein organic solvent (E) is an aliphatic hydrocarbon.

14. A primer composition as set forth in claim 8, wherein the amount of organic solvent (E) is 500 to 1,500 parts by weight.

15. A primer composition as set forth in claim 8, wherein the amount of organotitanium compound or partially hydrolyzed condensate thereof (F) is 1 to 10 parts by weight.

* * * * *